Dec. 14, 1937.  J. P. WEIS  2,102,397
METHOD OF MAKING SEAMED ARTICLES AND APPARATUS THEREFOR
Filed July 31, 1934   3 Sheets-Sheet 1
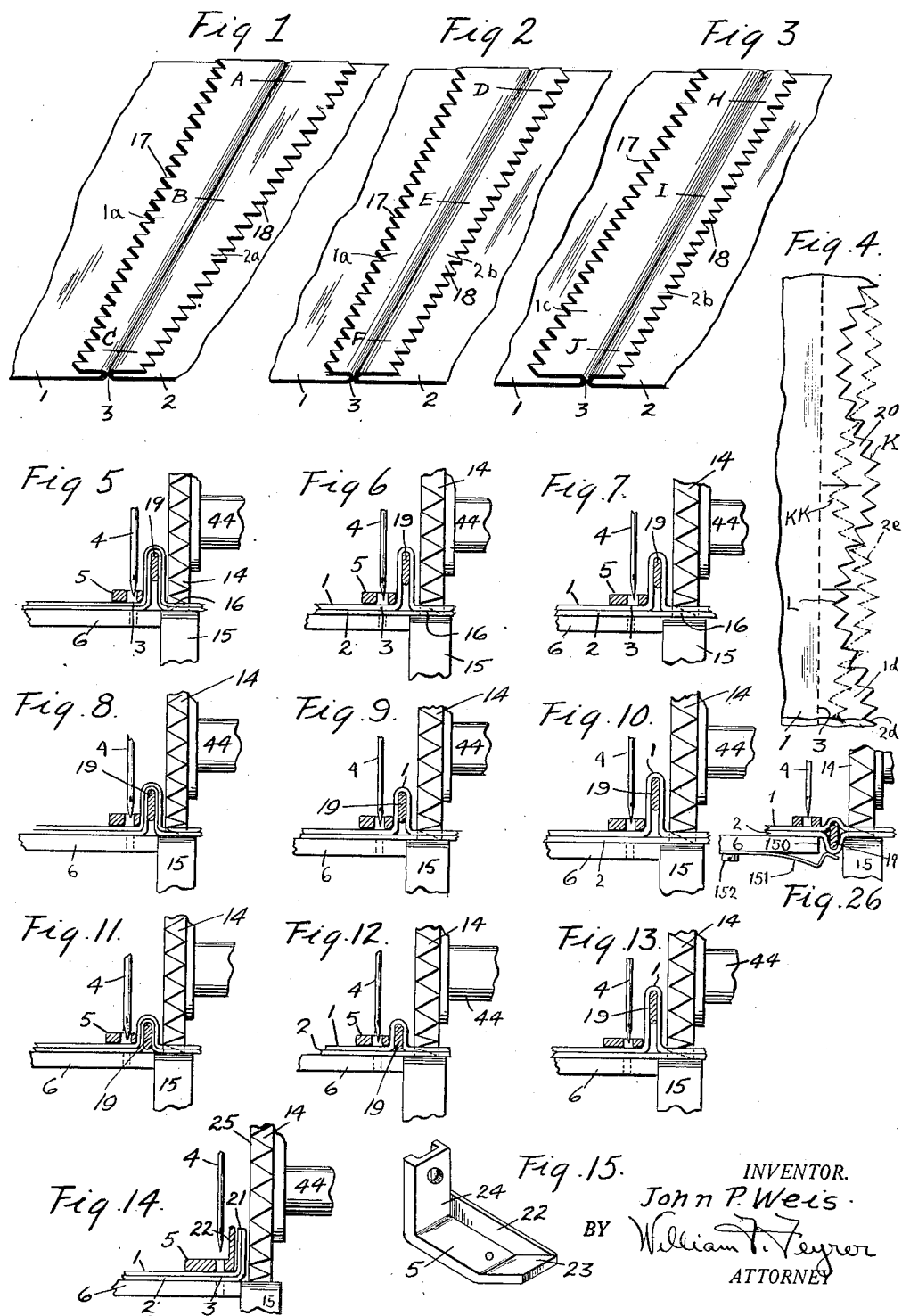

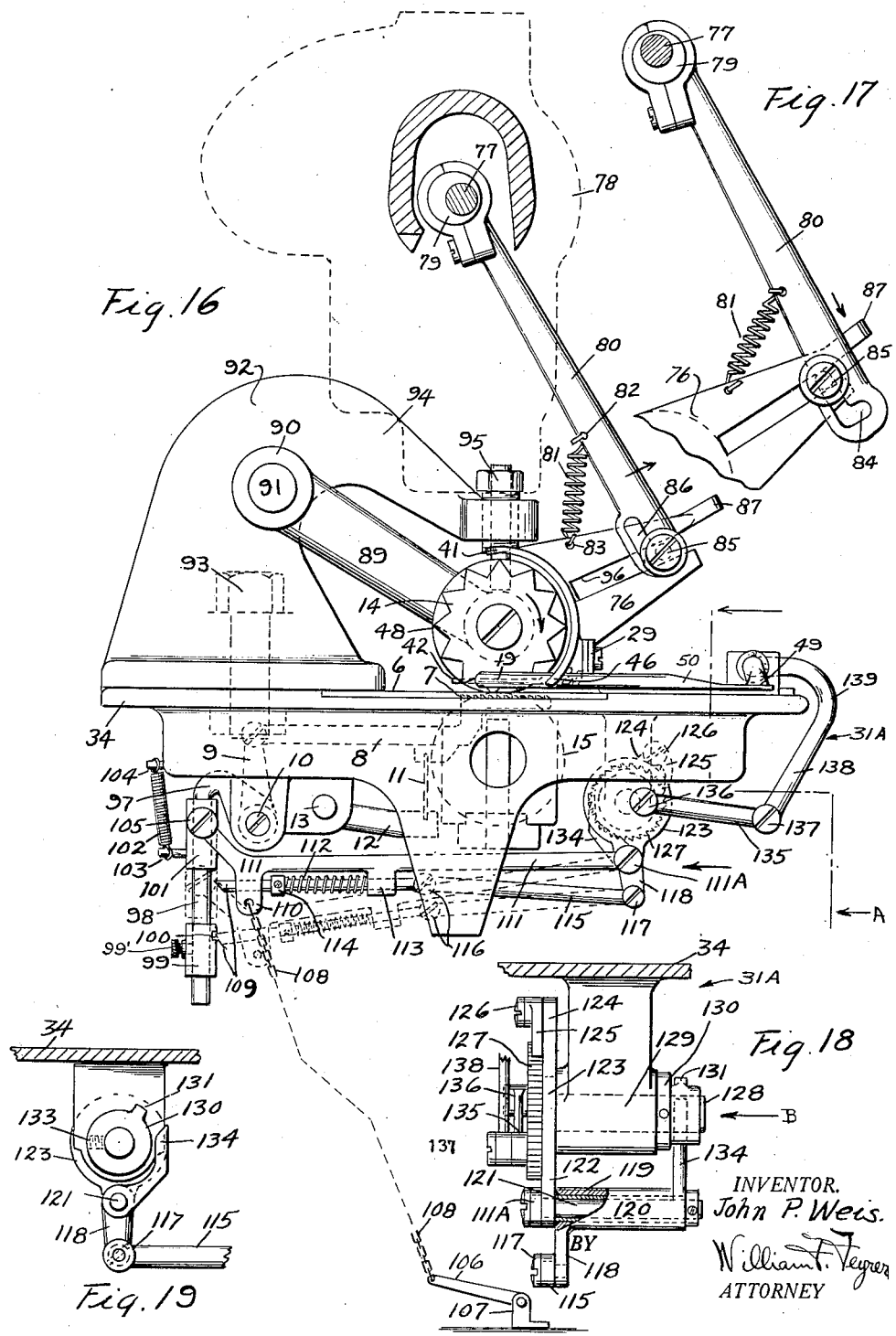

Dec. 14, 1937. J. P. WEIS 2,102,397
METHOD OF MAKING SEAMED ARTICLES AND APPARATUS THEREFOR
Filed July 31, 1934 3 Sheets-Sheet 3
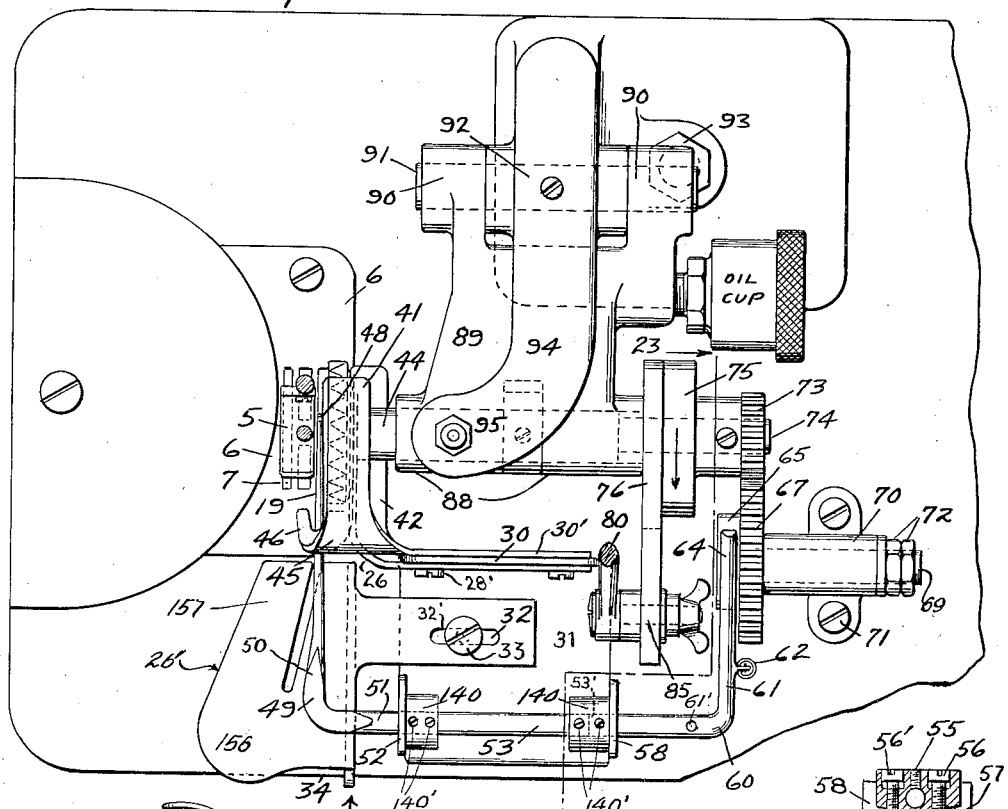
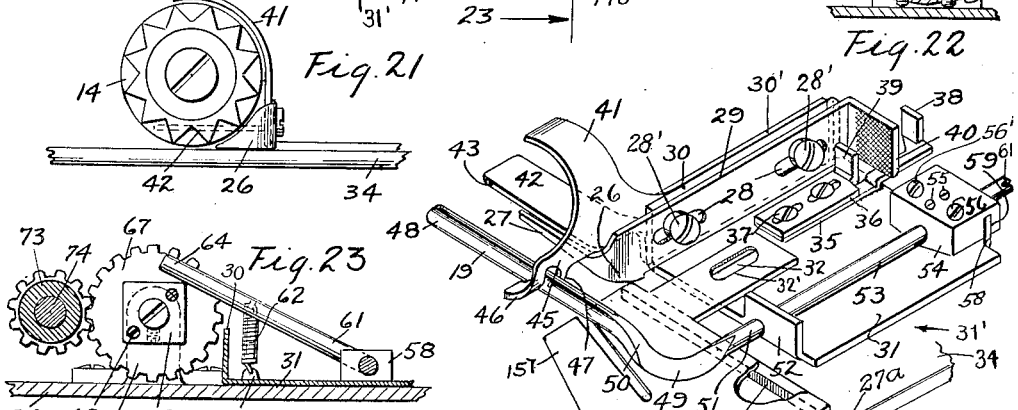
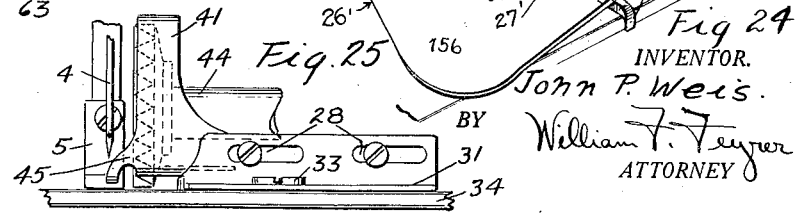
INVENTOR.
John P. Weis.
BY William F. Feyrer
ATTORNEY Patented Dec. 14, 1937

2,102,397

UNITED STATES PATENT OFFICE 2,102,397

METHOD OF MAKING SEAMED ARTICLES AND APPARATUS THEREFOR

John P. Weis, Nyack, N. Y., assignor to Willcox & Gibbs Sewing Machine Co., New York, N. Y., a corporation of New York Application July 31, 1934, Serial No. 737,704

57 Claims. (Cl. 112—124)

This invention relates to new and improved methods for making seamed articles and apparatus therefor, to produce uniform and satisfactory products economically.

Heretofore it has been the custom, in the garment industry in particular, to produce seamed articles having loose seam margins in order to facilitate later intentional separation for improved fitting, and to produce articles with tapering seam margins in order to save material in those places where the garment will need to be let-out but very little or not at all, and wide spaced at the point where the garment is normally let-out very much. Usually the tapered seam margins are made by carefully cutting plies of material to the desired finished size and then separately stitching the plies together very carefully in a disconnected subsequent operation. This often results in an uneven and unfinished looking product. In other instances the seam margins are separately trimmed by manual manipulation of the completed garment subsequent to the formation of the seam. In the latter, since the operator has to manipulate the entire garment and shift it by guess work relative to the pre-stitched seam, the product is very often spoiled or rendered unsatisfactory.

In some sections of garments it is desirable to have a pinked seam, but with parallel, narrow, and wide spaced seam margins, the former so that material may be saved, and the latter in order to have the let-out entirely on one side of the garment so that its subsequent general appearance will not be spoiled.

As with the tapered form of seam margins just described, difficulties were encountered in trying to produce a uniform product with double width parallel seam margins, in the methods and apparatus heretofore proposed. Also, so far as the applicant is aware, separate disconnected steps were necessary to trim the seam margins subsequent to the stitching, or in many instances a very careful operation of stitching plies of the article with overcast edges together in definite relation to the margins was required.

It is also desirable in some forms of work to provide a seam having a ply with a straight seam margin and another ply with a tapering seam margin, the latter to take care of a let-out accurately in one direction. And, in some forms of work it is desirable to produce an article having a seam with alternate narrow and wide spaced seam margins for ornamental and utilitarian purposes.

The most general practical application for these seams and use of methods and apparatus for their production is in the manufacture of wearing apparel, particularly in the clothing industry, where the seams of trousers, coats, dresses, women's suits, and the like, are usually formed by first overcasting each separate piece of fabric by itself to prevent the free edges from raveling. Then these component parts of a garment are assembled and stitched together, two or more plies at a time, with tapered or double width seam margins. Other variously shaped seams are also desirable. In all, the operator is instructed to use care to have the margins of the fabric pieces located in particular relation to the stitching, or to carefully trim the edges of the seam with a separate operation. With the methods and apparatus heretofore used it is difficult to maintain the position of the plies relative to the needle to produce a seam that is uniform and accurate, according to the design of the garment, or to obtain uniform and desirable seam margins.

With the present invention the above difficulties are overcome by a simple arrangement of parts and an automatic control that forms a seam with pinked margins of diversified shapes; thus obviating the necessity of the separate operations of overcasting, the use of the sewing threads, the use of separate machines for separate operations, the shifting of the work from one machine to another, and all expense and time incidental thereto. In addition new and improved articles, and improved methods of manufacture are disclosed.

It is an object of the present invention to provide articles having new and improved seams and seam margins, for desirable ornamental and utilitarian advantages.

It is a further object of the present invention to provide a method of forming sewed articles with double width and other variously spaced seam margins in a single handling of the work, in order to obtain a uniform product and to effect economies in production costs.

It is a still further object of the present invention to provide apparatus adapted to produce new and improved sewed articles in a single handling, instead of a double or triple handling as would be required with the usual apparatus and methods used heretofore.

Yet another object of the present invention is to provide an apparatus adapted to permit changing from the formation of a plain stitched and untrimmed seam to a stitched seam with a double width or other variable spaced seam margins in the one article.

Another very important object of the invention is to produce, in one operation, and with one passage through the machine, the outlet or crotch seam for trousers, which seam has marginal outlets at the waist band of an inch or more surplus of goods on each side of the seam, which seam gradually narrows down to about ½", where it approaches the crotch and joins the two inside leg seams of trousers. This seam is produced in a very simple manner with the present invention. The operator guides the work in the ordinary way and the mechanism provided so acts upon the fabrics being stitched that the tapered and other irregular marginal portions of the seam are produced without special manual manipulations or effort. Automatic means, mechanically arranged to regulate the seam margins and the width of seam from the pinked edge to the stitch line, are repeatedly produced by prearranged adjustment of the mechanism, so that one garment after another may be passed through the machine for the production of uniform work.

In most of the above objects, too, it is usually desirable to pink the trimmed seam margins, and to this end it is an object of the present invention to provide means whereby these seams of either straight, tapered, curved, or scalloped margins, may be pinked by a trimming device which severs the raw edges from the materials simultaneously with the stitching and with the formation of the variable width seam margins, automatically as the stitching proceeds and in some forms of the invention, preferably independently of hand manipulation of the materials by the operator after the materials are initially guided to the stitching position.

A feature of the present invention is the provision of sewed articles with an improved seam, having various types of seam margins. Some of the seam margins are: double width seam margins; parallel and tapering seam margins; parallel and scalloped seam margins; a plurality of scalloped seam margins in spaced relation to each other; and any combination of the above in the one article.

Another feature of the present invention is the provision of an improved method for producing any of the articles first set forth to insure uniform results and preferably with a single handling of the work in order to effect the manufacturing economies.

A further feature of the present invention is the provision of a novel apparatus to produce the articles and to facilitate the methods used in the production thereof as outlined in the two preceding paragraphs, which may be manually manipulated or operated automatically during the regular stitching and trimming operations.

A still further feature is the provision of articles, and of methods and apparatus therefor, having and producing variously shaped seam margins with the edges thereof pinked to prevent raveling and to insure a better final product.

Yet another feature is the provision of a novel work controlling device which may be shifted, or adjusted easily to obtain various effects, which may be easily and quickly moved into inoperative position relative to the work, or moved into a manually or automatically operative position, and which may be operated in a novel manner by the regular driving means used for driving other instrumentalities. In one aspect this feature includes mechanical means that may be adjusted to reproduce seams and seam margins with easily interchangeable pattern masters, adapted to control the movement of the plies of material during the stitching and trimming, or to make such adjustments in control mechanism to so act upon the sewed articles and to produce uniform seam structures with marginal differences according to a selected pattern or design.

By describing the invention for use on garments and in the clothing industry, it is not to be limited thereto, for its broad application will find many uses in other industries as well. Other objects, features, and advantages will be apparent or explained hereinafter.

In the drawings:

Figure 1 is a fragmentary detail representing the tapered outlet seat seam, as used in trousers.

Fig. 2 illustrates another form of two-width seam, having one seam margin parallel with the line of sewing, and the other margin at a taper thereto.

Fig. 3 illustrates the usual parallel two-width seam as used on trouser legs.

Fig. 4 illustrates two forms of curved or scalloped seam, that may be produced by the method and apparatus of the present invention.

Figs. 5 to 13 inclusive are step-by-step details illustrating the manner in which various seams are produced, and show the mechanism for effecting a change in the marginal widths of the seam between the stitch line and the free edges thereof, and the manner in which these variations are accomplished without adjustment or change in space between the needle for producing the stitches and the trimming cutter for producing the pinked marginal free edges.

Fig. 14 illustrates the manner in which the free edges of the goods may be passed at right angles into a vertical position between the needle and the trimming cutter for varying the widths of seams without trimming the edges thereof.

Fig. 15 is a perspective view of the presser foot shown in section in Fig. 14 for the production of untrimmed seams.

Fig. 16 is an end elevation of the sewing machine with a trimmer, and of the novel automatic control means for the materials provided by the present invention.

Fig. 17 is a detail of the coupling and uncoupling means for putting the trimming cutter into and out of operation.

Fig. 18 is a fragmentary detail of one form of marginal pattern control mechanism, for controlling the marginal widths of the seam, looking in the direction of the arrow A in Fig. 16.

Fig. 19 is a detail of the trip control parts shown in Figs. 16 and 18, looking in the direction of the arrow B in Fig. 18.

Fig. 20 is a top plan view of work controlling means similar to that shown in Fig. 16, but provided with a gear driven pattern or master control means, for acting upon and controlling the marginal edges of the seams.

Fig. 21 is a detail view of the trimming cutter and a combination guard and guide for the work control.

Fig. 22 is a detail sectional view showing adjusting and locking means for the work control guide, used for regulating the marginal distance between the line of stitches and the trimmed edge of the work, taken through screws 56 and 56' in Fig. 24.

Fig. 23 is a detail view of the present preferred gear driven pattern plate control means shown in in Fig. 20, the section being taken on the line 23—23 of Fig. 20.

Fig. 24 is a perspective of one form of guide and work control for forming double width marginal seams, with fixed adjustment for the continuous production of parallel margins of two-width seams shown in Fig. 3.

Fig. 25 is a front elevational view of a slightly modified form of the structure shown in Fig. 24.

Fig. 26 is a view similar to Fig. 10, of an arrangement of the present apparatus to form a variable width margin alternately on two plies.

In the drawings, the present invention is shown with two plies 1 and 2 (upper ply 1, lower ply 2) of fabric or other material together with a stitched seam 3. While these plies feed into the stitching mechanism of the sewing machine superposed, the stitches are made by the needle 4 and the usual loop taker, either bobbin or looper (not shown) and the work is fed past the stitching mechanism by a presser foot 5, co-acting with a throat plate 6 and a feed dog 7. The feed dog is carried by the usual feed bar 8 and operated by feed arm 9, driven by the usual rock shaft 10, in a well known way.

The feed dog is given a lifting motion by a flexible link 11 connected to the feed bar 8 and to a lifting bar 12 that is operated by a rock shaft 13, also operated in a usual and well known way, the feed operating through the throat plate 6 as a four way motion.

The presser foot, provided with a yielding pressure to hold the work down on the feed dog 7 and throat plate 6, assists in feeding the plies 1 and 2 through the stitching position, while a trimming (preferably pinking) cutter 14, having a synchronized rotary step by step motion in timed relation with the feed dog 7, may co-act with a roller or some other element as indicated by 15, with which it co-acts under pressure, to sever the goods at 16, producing pinked edges 17 and 18.

In order to control the marginal widths of the seams from the line of stitching 3 to the pinked edges 17 and 18, the present invention provides and makes use of a guiding element 19, over which one or more plies, for example the plies 1 and 2, travel in an inverted U-shaped formation. The elevation of this guiding element 19 with respect to the throat plate controls the margin or width of seam from the line of stitching 3 to the pinked edges 17 and 18, and by providing means for automatically giving rise and fall movement to this guiding element the marginal widths of seams may be varied and controlled according to the extent of movement, and the position of the guiding element 19 relative to the throat plate may be varied. Figs. 5, 8, and 11, are illustrative of the manner in which all the plies are moved a substantially equal extent relative to the line of stitching to produce coadjacent long tapered seam margins 1a and 2a as shown in Fig. 1 and the coadjacent variable seam margins 1d and 2d shown in Fig. 4.

Fig. 2 illustrates another improved article of the present invention with the plies 1 and 2 joined together by the seam 3 and having one ply, for example ply 1, formed with a tapered seam margin 1a, while the marginal pinked edge 18 of ply 2 is parallel with the line of stitching 3 to form a narow parallel or straight seam margin 2b. This is accomplished as shown in Figs. 6, 9, and 12 by having the ply 1 feed over the moving guiding element 19 while the ply 2 feeds flat relative to the stitch line 3 and the cutter 16.

Fig. 3 illustrates an article, such as a pants leg seam, where the plies 1 and 2 have been stitched together by the line of stitching 3 to form an article with double width parallel seam margins 1c and 2b. Such an article is particularly desirable where it is desired to let out a garment on one side only, and to save material on the other side.

Fig. 7 illustrates how this is produced: viz., the ply 1 is passed over the guiding element 19, while this element is held in fixed position, and concurrently the fabric 2 is passed through in the flat position in order to create the wide seam margin 1c and the narrow seam margin 2b as the two plies are trimmed by the pinking cutter at 16.

Now viewing Fig. 1, the seam margins 1a and 2a wide spaced as on the line A are represented as being formed in Fig. 5; the closer margins as at B are represented as being formed in Fig. 8; and the same seam margins, narrow spaced as at C, are represented as being formed in Fig. 11.

For the article shown in Fig. 2, the seam margins 1a and 2b as at D are represented as being formed in Fig. 6; at E are represented as being formed in Fig. 9; and at F are represented as being formed in Fig. 12.

Similarly, for the article shown in Fig. 3, the seam margins at H, I, and J are represented as being formed in Figs. 7, 10, and 13. Although the seam margin widths are the same at these three points, the guide 19 may be set at different stations to produce a coextensive margin 1c which although paralleling the line 3 may be of different widths.

Now, viewing Figs. 4 and 5, if the guide 19 is operated up and down continuously, the mechanism is capable of trimming and producing a curved or scalloped trimmed edge, as indicated by 20, and with a variably spaced seam margin 1d and 2d. The marginal edge from the line of stitching 3 to the pinked edge 20 as indicated by K and the marginal edge as indicated by L may represent the high and low position of the guiding element 19, which according to the present invention is capable of automatic rise and fall motion, in timed relation with the feeding mechanism, so that as a given distance of goods passes the needle, the relative up and down movement of the guiding element 19 would effect a curved or otherwise variously shaped pinked and trimmed outline seam margin.

A modification of the latter is also shown by dot-and-dash lines in Fig. 4 and by the detail view Fig. 26, in which the upper and lower plies 1 and 2 are alternately lengthened and shortened in order to provide a wide margin as at K to the upper ply 1 and a narrow seam margin KK to the lower ply 2, and vice versa. The dot-and-dash line 2e represents the seam margin of the lower ply.

In Fig. 14, there is shown the manner in which the plies 1 and 2 may be fed past the stitching position into a vertical position as indicated by 21, passing up between the needle 4 and the trimming cutter 14, so that the margin from the untrimmed edges 21 to the line of stitching may be varied according to the amount of goods fed between the stitching and cutting elements, thereby eliminating the trimming action, which facilitates the handling of certain portions of garments where trimming would be objectionable. That is to say, some portions of the garments are designed to be stitched together without trimming, while other portions call for trimming and the arrangement of parts shown permits this plain stitching without trimming in a very simple manner, by permitting the goods to pass up vertically between the needle and the trimming cutter. To accomplish this a guard wall 22 extending from the toe 23 to the shank 24 of the presser foot is provided, and it also prevents the goods from folding over in the path of the needle.

Similarly, the present invention provides a work controlling device 31' and a guide 26 that can quickly be adjusted past the periphery of the cutter and with a straight edge 27 in line with the left hand face 25 of the trimming cutter to prevent the goods from reaching the cutting edges of the trimmer 14. This structure is best shown in Fig. 21 as closely fitting the curved line of the circular pinking cutter 14, and when adjusted in line with the face 25 of the cutter prevents the raw edges 21 of the plies from passing into the path of the cutter. The guide 26 is provided with elongated slots 28 in a wall 29, clamped by screws 28' against the vertical wall 30, part of a base plate 31. The latter may be provided with an elongated slot 32, through which a bolt or screw 33 may pass to clamp it to a bed plate 34 of the sewing machine.

A complementary guide 26' may also be used, with a complementary straight edge 27', the latter in line with the straight edge 27, to insure an even or straight travel of the work even though there are slight irregularities in the rough edges thereof. It too is adjustable relative to the cutter 14 by a slot 32' and is held in place by the screw 33 and by a hook 27a. A thin spring plate 156, part of the guide 26', is spaced from the table 34 sufficiently to accommodate one or more thicknesses of material and is flexed preferably with a finger 157 to press on the plies thereunder. The edge 27' and plate 156, although not absolutely essential, insure a smoother, straighter, and more satisfactory product. Further, they eliminate manual control of the materials once the materials are started at the needle, and insure proper directional feed and control of the lower strips which are normally hidden by the upper ply or plies.

The new and improved articles shown in Figs. 1, 2, 3, and 4 are particularly advantageous in the garment industry, and to provide these with a uniform seam margin saves material and insures material enough for let-out. Also, the longitudinally spaced wide and narrow seam margins give added material for connecting straps or the like while the adjacent narrow seam margins prevent a loose flopping seam margin. Similarly, the alternate wide and narrow spaced seam margins 1d and 2d enable the operator to grip and spread the individual plies easily. Many other similar advantages are obtained with these new and improved products.

The work controlling device 31' may also carry adjustable stop pieces 35 and 36 held in place by screws 37. These plates are provided with upturned stop lugs 38 and 39 to act against the forwardly extending finger grip 40. Adjustment of these stops varying the space between the portions 38 and 39 enables the guide 26—27 to be quickly adjusted to the extreme of either of two positions, and said positions may be varied to suit the kind of work to be produced. One adjustment can represent a non-cutting position of work, and the other, one that would permit trimming from the raw edges of the work and provide a margin of suitable width to always insure uniform edges 17 and 18.

An auxiliary guide 30' is also secured to the wall 30 by the screw 28', the latter being passed through suitable elongated slots in the wall 30 and threaded into the guide 30'. This guide terminates in an overhanging circular cutter guard 41, to protect the operator from injury, and to prevent the goods from getting into the path of the cutter. Extending from the auxiliary guide is a flat guard 42 spaced sufficiently above the cloth plate 34 to permit the goods to pass between the top surface of the cloth plate and this guard, which has its projecting edge 43 near the right hand face of the pinking cutter. This prevents the trimmed off margin of goods from following around and getting tangled with the cutter, and also prevents any threads or particles of work from coming in contact with or winding up on a shaft 44.

Extending from the auxiliary guide 30', is also a forked member 45, having one prong 46 extending to the left and another prong 47 extending to the right of the guiding element 19 and forming a female portion into which the male portion or guiding element is moved or supported in order to fold over the plies 1 and 2 in a U-shape as they pass through this opening. The relation of one element to the other, with respect to freedom or space for the free movement of the fabrics is, of course, arranged to suit the character of work to be seamed, that is to say, an opening sufficient for heavy mackinaw materials would not be satisfactory for the formation of seams in voile, or delicate silk materials. The space must be reasonably within the limits of a variety of closely allied fabrics in order to satisfactorily form the seams. Preferably the element 19 is made as a thin laterally flexible strap, for example, to centralize itself in the forked member 45.

Since the presser foot 5 and throat plate 6 hold the main plies 1 and 2 while the trimming cutter 14 tends to pull the loose ends 21 taut over the guide 19, the use of the forked member 45 is not absolutely essential. Its use, however, provides supplemental positive means for drawing the plies taut on the guide 19.

The guiding element 19 ends at 48, and this end extends up to or past the stitching position sufficiently to hold the goods in U-shaped formation until after the stitches secure the seam. Forwardly of this end, near the operator's position, the element is bent at right angles and is flattened at 49 to facilitate the passing of one ply of goods over the top and one underneath. This flattened portion may be wedge shaped, tapering from one side to the other, to have a wedging effect as indicated at 50 to assist in spreading or splitting the goods, one ply from the other as it feeds rapidly over and under this guiding element, particularly when the spring guide 26' is not used, or between the second and third ply when the guide 26' is used between the first and second ply.

A pivot rod continuation 51 extends through upstanding brackets 52 and 58 where it rocks in suitable bearings. The intermediate portion 53 fits snugly into the block 54, where it is clamped by set screws 55, and these set screws may rest on a flattened portion of the rod to securely hold it in position. Adjacent the clamping screws 55 are adjusting screws 56 and 56' and by manipulating these screws, the guiding element 19 may be adjusted to and from the throat plate 6 to change the width of the seam margins.

Screws 55, 56 and 56' are tapped into the block 54 which is shaped on the bottom as at 57 so that it may be rocked or adjusted for changing the position of the guide. To prevent endwise movement, the bracket 58 is closely but freely fitted into a saw cut 59 of the block 54 to securely hold the parts from endwise movement in the direction of the pivot rod 53, and fixes the relative position of the guiding element 19, with respect to the needle 4 and the cutter 14, so that its location is approximately central, providing a channel between the presser foot 5 and the side wall 25 of the cutter 14, for the free passage of the work.

By loosening the screw 55, the guiding element 19 may be shifted with respect to the needle or removed from the bearings 52 and 58, and without it the guide is useful for many other kinds of work, as well as for ordinary stitching operations, since the overhanging portion 41 guards the cutter and the extending portion 42 guards the trimmed off goods from winding around the cutter or the shaft, and the portion 26 effectually guides the edge of the fabric to the cutting mechanism, and the shifting means for changing the position of the guiding portions 26 and 27 with respect to the needle is useful in connection with seaming and pinking machines. Moreover, the entire work controlling device 31' may be quickly attached to and detached from the sewing machine so that other attachments may replace it for other special operations.

Any suitable wire may be passed into hole 61' to provide a handle for manipulating the guide 19 as the regular stitching and trimming proceeds thereby producing a wide variety of seam margin shapes in the one passage of an article.

For automatically operating the guiding element 19 and to give to it a rise and fall motion, the laterally extending portion 53, where it projects from the bearing 58, may be provided with a right angle bend 60, or instead of this bend, it could have clamped thereto, an extending arm 61, having attached thereto, one end of a spring 62, with the other end thereof attached at 63 to the plate 31. The extending end 64 contacts with a pattern cam or master 65, (see Figs. 20 and 23) which may be of any suitable form, having one or more lobes, each of which would lift the arm 64 and the guiding element 19 against the tension of the spring 62, or the spring can be eliminated if a double wall cam is provided in place of cam 65 as shown, in which event, a stud or roller in the double wall cam would operate the arm 64. The master 65 is made part of or separate from a gear 67. If the cam is made detachable, by screws 68, other patterns or cams may be rapidly applied for the production of different kinds of work.

The gear 67 is mounted on a shaft 69, supported in a bearing 70 attached to the cloth plate 34 by screws 71, or to a suitable extension on the plate 31. The end of the shaft is provided with a collar and adjusting nuts 72 to control the endwise movement. This gear is enmeshed and driven by another gear 73, which is driven by the end 74 of the cutter shaft 44. The ratio of the gearing is arranged to give proper timed movements to the guiding element 19. Therefore, gearing of 2 to 1, 3 to 1, or any other ratio is readily interchangeable for use in producing different kinds of work.

A clutch 75 is secured to the cutter shaft 44 with an associated oscillating lever 76, which transmits a step by step rotary movement to the clutch in the direction of the arrow. This clutch may be of any of the well-known constructions, and operated by any suitable medium. In the present instance, however, it is operated from the top shaft 77 of the sewing machine head or top arm generally indicated by 78 shown in dotted lines of Fig. 16.

An eccentric 79 transmits movement from the shaft to a connector rod 80. This connector rod has a spring 81 connected to it at 82 while the other end 83 thereof is connected to the lever 76. The arrangement and location of this spring is at a suitable angle with relation to the parts so as to hold them in two definite pre-determined positions, one as shown in Fig. 16, and the other as shown in Fig. 17.—The end of the rod 80 is provided with an L-shaped slot or opening 84, and when a connecting pin 85, adjustably clamped in the lever 76 is brought into engagement with the L-shaped opening 84, (see Fig. 16) the relation of the parts is such as to transmit oscillating motion to the lever 76.

When the connection 80 is grasped by the fingers of the operator and moved in the direction of the arrow of Fig. 16, the spring instantly changes the relative position of the parts to that shown in Fig. 17, in which position the connection 80 merely operates on the stud 85 in the portion of the slot 86 without giving oscillating motion to the lever 76, with the result that the trimming cutter 14 remains in fixed position without the rotary step by step movement, and therefore, no cutting of goods will result. The machine may thus be used without the trimming action, and instantly, as trimming is required, the operator grasps the handle 87, pushing it downward in the direction of the arrow of Fig. 17 as far as it will go in the L-shaped slot 84, and the spring 81 will instantly return the parts to the position shown in Fig. 16, putting the cutter 14 into step by step motion for cutting action again.

The cutter shaft 44 operates in bearings 88 on a swing frame 89, pivotally mounted at 90 on a shaft 91 secured in the frame casting at 92, which frame casting is in turn secured by bolt 93 to the bed plate 34 of the machine. The overhanging arm 94 has a pressure regulating means 95 giving pressure to the cutter 14 against the cooperating member 15. The cutter 14 is secured to the shaft 44 in any suitable way. These cutters are interchangeable for different designs of pinked forms or straight cutters as the work may require. To change the stroke of the cutter, the connector 80 and the clamping pin 85 are brought to different positions in the slot 96 of the lever 76. This is only necessary when it is desired to change the length of the stitch or stroke of the feed, as the case may be, for the kind of work which would be required, as for instance, 8 stitches to the inch, or 18 or 20 stitches to the inch.

In order to avoid the necessity of changing gears 67 and 73 which are operated intermittently by the clutch 75 with step by step motion in timed relation to the needle 4 and feeding mechanism, the present invention provides also another form of work guiding or control device 31A operated from the feeding mechanism and located below the bed plate 34 of the machine, which consists of a very simple and efficient construction and arrangement of parts.

This modified form of work control device is shown in Figs. 16 through 19 particularly, and comprises an arm 97 secured to the feed rock shaft 10, (see Fig. 16) terminating in stem 98, projecting downwardly. An adjustable collar 99 with a notch 100 is slidable in the stem and is held in various positions thereon with a screw 99'. Upon this stem also slides a sleeve 101. A spring 102 connects with this sleeve at 103 and to the bed of the machine at 104 and holds the sleeve in the position shown in full lines. In this position, movement transmitted to the sleeve and to the shoulder screw 105 carried thereby is merely up and down in a curved path with the center of the shaft 10 as an axis for this movement.

The foot treadle 106 supported on the hinged bracket 107 attached to the floor may be depressed by the foot of the operator, thus pulling down on the chain 108 and drawing the latch 109 to the dotted line position to engage the notch 100. The chain is attached at 110 to a lug of a lever 111, which is connected to the sleeve 101, by the shoulder screw 105. The other end is freely connected at 111A to the friction plate 123, for giving oscillating motion thereto to drive the ratchet wheel 127. When the collar 99 is secured high on the stem 98, the arm 97 imparts but a short movement to the lever 111 and to the associated ratchet wheel 127, and when secured low thereon it imparts a long movement to both the lever and ratchet wheel.

Latch 109 engages the notch 100 and stays in that position under the tension of a spring 112, which has one end resting against the bearing 113 and the other end resting against adjustable collar 114. This latch, under the control of the spring operating in the connection 111 is released against the tension of the spring as and when desired by a link 115, loosely connected at 116 to the latch 109. The other end of the link is loosely connected at 117 to a lever 118 mounted for rocking movement on a sleeve 119 in a bearing 120, and is carried by a stud 121 secured in an arm 122 of a friction plate 123, the latter being circular in form and about the same diameter as a ratchet wheel 127 having a projecting arm 124 which has pivotally secured thereto, under spring tension, a ratchet pawl 125, by screw 126. This ratchet pawl engages the teeth of the ratchet wheel 127, giving to it a step by step rotary motion. The ratchet wheel 127 is provided with a fixed shaft 128, which freely moves in bearing 129 that may be attached to or form part of the bed plate 34.

The friction plate 123 carrying the ratchet 125 operates between the ratchet 127 and one face of the bearing 129. Against the other face of the bearing 129 (see Fig. 19) is a collar 130 with projecting lug 131 secured to the shaft by a set screw 133. This collar, movable axially on the shaft to prevent endwise movement of the shaft in the bearing, may also be adjusted radially to bring the lug 131 into timed relation with an arm 134 to trip the mechanism and put it out of operation wherever desired, with relation to the position of the work guiding element 19. That is to say, it may be timed to stop the element 19 in its lowest position or in its highest position, or in any intermediate position, because as the lug 131 engages the arm 134 of the lever 118, it swings the lever on the bearing 119, shifting the link 115 against the action of the spring 112, and withdrawing the latch 109 from the notch 100, thereby permitting the spring 102 to return the sleeve 101 to the full line position.

The dotted line position shown in Fig. 16 of the parts represents the work controlling device 31A in motion. The ratchet wheel 127 operates to turn the lug 131 and trip the arm 134. Connected to the face of the ratchet is a link 135, by a screw 136. The other end is freely connected by screw 137 to the depending end of arm 138. This arm bends up and over the bed plate 34 at 139 and connects with or forms part of the work guiding element 19, at or about the position indicated between the bearing 58 and the right angle bend 60, as to the hole 61'. Collars 140, shown in Fig. 20, prevent end movement of the guide 19 in the bearings 52 and 58 so as to maintain proper working relation of the guiding element 19 with respect to the needle 4 and trimming cutter.

From the foregoing, it will be clear that a manipulation of the treadle 106 puts the parts into action, whereby while the machine is sewing and trimming, the ratchet 127 is rotated and the link 135 gives movement to the arm 138, rocking the member 53 in the bearings 52 and 58 to give an up and down movement to the work guiding element 19. One cycle of the ratchet mechanism may represent various lengths of stitching operations, in that the stroke of the ratchet pawl may engage every tooth, every other tooth, every third tooth, etc., as the case may be, so that the up and down movement of the work guiding element 19 may take place in the stitching of an article 6" long, or one many times longer than that. In fact, it may be regulated and arranged to meet any desired use or width of marginal space. The collar 99 permits this.

In Fig. 26 the throat plate 6 is shown with a cut-out 150 and the side of cooperating member 15 parallel the left side of trimmer 14 to form a channel adapted to receive the lower ply (or plies) 2. The width of the channel is proportioned to receive the guiding element 19 and the ply 2 of material. A flat spring 151 is secured to the underside of the throat plate with a screw 152.

With this arrangement the upper and lower plies may be alternately shortened and lengthened relative to the trimmer 14 to produce the seam margin 1d and 2e shown in Fig. 4, to facilitate gripping and spreading the margins. As illustrated the guiding element moves each ply an equal extent, but this may be varied to obtain different effects.

The shaft 53 is preferably split at 53' so that the guiding element 19 end thereof may be shifted down into the channel, or above the throat plate 6, to obtain various widths to the seam margins in all the articles above described by merely loosening one of the screws 140' or the collar 140, or by loosening one of the screws 55 on the block 54. This split also facilitates assembling the guiding element 19 to the control devices 31' or 31A.

In using any of the above described forms of apparatus it is merely necessary to pass all the plies of work under the presser foot 5 and over the guiding element 19 in order to make articles as illustrated in Figs. 1 and 4 and to pass one (or more) ply over the guiding element 19 and one (or more) flatwise across the throat plate 6 in order to make articles as shown in Figs. 2, 3 and the 1d and 2e form of seam margin.

From the foregoing it will be apparent that the present invention provides new and novel methods for producing articles with novel seams having: adjacent equispaced and tapering seam margins; longitudinally coextensive tapered and straight seam margins, having narrow and wide parallel seam margins; variably spaced seam margins, and in this latter connection in one form having wide spaced margins overlie narrow seam margins in the same article; and any combination of the above.

The main method consists in moving one (or more) superposed ply relative to the other one (or more) ply to vary the seam margin of one (or more) ply relative to the other one (or more) ply; stitching the plies together with a seam; and trimming both plies. Another method embraces substantially the same steps but consists of moving both (or all) the plies relative to the main body plies; stitching the main body plies; and trimming both (or all) the plies, all in one handling of the work. The order of the steps may be changed, if preferred. The apparatus above described facilitates carrying out these methods.

Although several seams have been illustrated and described mainly in connection with men's trousers and women's dresses it should be understood that the invention is capable of a much broader variety of seams and is applicable for the manufacture of divers other articles of apparel, for luggage, awnings, household articles, and countless other articles.

It will also be readily apparent that three, four, and more plies may be used in the articles, handled according to the method, and operated upon by the apparatus, of the present invention.

Other variations and modifications may be made within the scope of the invention, and portions of the improvements may be used without others.

I claim:

1. Apparatus to produce articles with a trimmed margin and stitched seam, comprising a sewing mechanism adapted to feed multiple plies of material and to form a line of stitching; a trimming mechanism adapted to form trimmed margins on the plies relative to the line of stitching; means for driving said sewing and trimming mechanisms synchronously; and means adapted to control and move one or more of said multiple plies to vary the margin thereof relative to the line of and at the time of stitching.

2. Apparatus to produce articles with a trimmed margin and stitched seam, comprising a sewing mechanism adapted to feed a pair of plies of material and to form a line of stitching; a trimming mechanism adapted to form trimmed margins on the plies relative to the line of stitching; means for driving said sewing and trimming mechanisms synchronously; and means adapted to control and move only one of said multiple plies between the sewing mechanism and the trimming mechanism during regular feeding of the plies and while the other ply travels in fixed spaced relation, to form a straight and a variously shaped seam margin on the pair of plies of the article.

3. Apparatus to produce articles with a trimmed margin and stitched seam, comprising a sewing mechanism adapted to feed multiple plies of material and to form a line of stitching; a trimming mechanism adapted to form trimmed margins on the plies relative to the line of stitching; means for driving said sewing and trimming mechanisms synchronously; and means adapted to control and move all of the plies between the sewing mechanism and the trimming mechanism to form a variously shaped margin on all of the plies relative to the line of stitching.

4. Apparatus to produce articles with a trimmed margin and stitched seam, comprising a sewing mechanism adapted to feed multiple plies of material and to form a line of stitching; a trimming mechanism adapted to form trimmed margins on the plies relative to the line of stitching; means for driving said sewing and trimming mechanisms synchronously; and means associated with the driving means adapted to automatically control and move one or more of said multiple plies to vary the margin thereof relative to the line of stitching.

5. Apparatus to produce articles with a trimmed margin and stitched seam, comprising a sewing mechanism adapted to feed a pair of plies of material and to form a line of stitching; a trimming mechanism adapted to form trimmed margins on the plies relative to the line of stitching; means for driving said sewing and trimming mechanisms synchronously; and means associated with the driving means adapted to automatically control and move only one of said multiple plies between the sewing mechanism and the trimming mechanism during regular feeding of the plies and while the other ply travels in fixed spaced relation to form a straight and a variously shaped seam margin to the pair of plies of the article.

6. Apparatus to produce articles with a trimmed margin and stitched seam, comprising a sewing mechanism adapted to feed multiple plies of material and to form a line of stitching; a trimming mechanism adapted to form trimmed margins on the plies relative to the line of stitching; means for driving said sewing and trimming mechanisms synchronously; and means associated with the driving means adapted to automatically control and move all of the plies between the sewing mechanism and the trimming mechanism to form a variously shaped margin relative to the line of stitching.

7. Apparatus for forming articles with a double width trimmed margin and stitched seam comprising a sewing mechanism adapted to feed and to stitch a pair of plies; a trimming mechanism, driven by the sewing mechanism; and means for controlling the plies, adapted to form a narrow seam margin to one ply and a wide seam margin to the other ply, with both margins parallel to the line of stitching.

8. Apparatus for forming articles with a double width trimmed margin and stitched seam comprising a sewing mechanism adapted to feed and to stitch a pair of plies; a trimming mechanism, driven by the sewing mechanism; and shiftable means for controlling the plies, adapted to form a narrow seam margin to one ply and a wide seam margin to the other ply, of various widths relative to the narrow margin ply, and with both margins parallel to the line of stitching.

9. Apparatus for forming articles with a trimmed margin and stitched seam comprising a sewing mechanism adapted to feed and to join a pair of plies of material with a stitched seam; a trimming mechanism driven by the sewing mechanism; and means for controlling the plies, adapted to form a straight seam margin to one ply and a tapering seam margin to the other ply.

10. Apparatus for forming articles with a trimmed margin and stitched seam comprising a sewing mechanism adapted to feed and to join a pair of plies of material with a stitched seam; a trimming mechanism; driving means for operating said mechanism coordinately; means for controlling one or more of said plies; and a pattern plate operated by the driving means and associated with the last named controlling means adapted to form variously shaped seam margins.

11. Apparatus for forming articles with a trimmed margin and stitched seam comprising a sewing mechanism adapted to feed multiple plies and having a needle to form a seam; a trimming mechanism, driven by said sewing mechanism, and adapted to form seam margins; and a member between said needle and trimming mechanism adapted to control the width of the seam margins.

12. Apparatus for forming articles with a trimmed margin and stitched seam comprising a sewing mechanism adapted to feed multiple plies and having a needle to form a seam; a trimming mechanism, driven by said sewing mechanism, and adapted to form seam margins; and a movable member between said needle and trimming mechanism adapted to variably control the width of one or more of the seam margins.

13. Apparatus for forming articles with a trimmed margin and stitched seam comprising a sewing mechanism adapted to feed multiple plies and having a needle to form a seam; a trimming mechanism, adapted to form seam margins; a movable control member between said needle and said trimming mechanism; and driving means adapted to operate the sewing mechanism, the trimming mechanism and the control member coordinately.

14. Apparatus for forming articles with a trimmed margin and stitched seam comprising a sewing mechanism with a needle adapted to feed and to stitch two plies of material; a trimming mechanism driven by said sewing mechanism; and a work controlling device adapted to guide one ply of material uniformly and the other ply variably relative to the trimming mechanism.

15. Apparatus for forming articles with a trimmed margin and stitched seam comprising a sewing mechanism with a needle adapted to feed and to stitch two plies of material; a trimming mechanism; a work controlling device adapted to guide one ply of material uniformly and the other ply variably to the trimming mechanism; and driving means adapted to operate said sewing mechanism, trimming mechanism, and the work controlling device coordinately.

16. Apparatus for forming articles with a trimmed margin and stitched seam comprising a sewing mechanism with a needle adapted to feed and stitch two plies of material; a trimming mechanism; a work controlling device adapted to guide the pair of plies and to form variably spaced margins; and means for driving said sewing and trimming mechanisms and said work controlling device coordinately.

17. Apparatus for forming articles with a trimmed margin and stitched seam, comprising a sewing mechanism with a needle, adapted to feed and to join multiple plies of material with a stitched seam; a trimming mechanism adapted to form trimmed seam margins on the plies; and a pair of ply engaging members between said needle and the trimming mechanism adapted to control the width of seam margins of one or more of said plies.

18. Apparatus for forming a trimmed margin and stitched seam comprising a sewing mechanism adapted to feed multiple plies and having a needle to form a seam; a trimming mechanism adapted to form seam margins; and a settable control member between said needle and the trimming mechanism for obtaining uniform parallel seam margins, of various widths, while the space between the needle and trimming mechanism remains constant.

19. Apparatus to produce articles with a trimmed margin and stitched seam adapted to feed multiple plies of material and to form a line of stitching; a trimming mechanism adapted to form trimmed margins on the plies relative to the line of stitching; control means for moving one or more of the multiple plies to vary the margins thereof; driving means adapted to operate said mechanisms and said control means; and coupling means adapted to connect and disconnect the driving means to the trimming mechanism and the control means.

20. The method of forming an article from multiple plies which consists of stitching the plies to form a seam with seam margins, of flattening one ply; of moving the margin of the other ply while the seam is being formed to produce a variable width seam margin; and of pinking both the flattened and the moved plies together.

21. The method of forming an article from a pair of plies in a single handling which consists in the steps, of joining the plies with a line of stitching; of forming a pinked seam margin on each of said plies; and of moving both the plies between the step of joining the plies and the step of forming a pinked seam margin to obtain a variable width seam margin.

22. The method of forming an article from a pair of plies in a single handling which consists in the steps, of joining the plies with a line of stitching; of forming a pinked seam margin on each of said plies; and of moving both the plies between the step of joining and the step of forming a pinked seam margin to form a narrow margin on one ply while forming a wide margin on the other and vice versa.

23. The method of forming an article from a pair of plies in a single handling which consists in the steps of joining the plies with a line of stitching; of forming a pinked seam margin on each of said plies; of moving one or more of the plies between the line of stitching and the seam margin through a longitudinal section of their length and of discontinuing the moving thereof between the step of stitching and the step of pinking through another longitudinal section of their length to obtain a straight and a variable width seam margin in the one article.

24. Apparatus to produce articles with a trimmed margin and stitched seam, comprising a sewing mechanism adapted to feed a pair of plies of material across a cloth plate and to form a line of stitching; a trimming mechanism adapted to form trimmed margins on the plies relative to the line of stitching; means for driving said sewing and trimming mechanisms synchronously; a guide member for moving one of said multiple plies to vary the margin thereof relative to the margin of the remaining ply; and a spring means for pressing the remaining ply to facilitate control and feeding thereof.

25. Apparatus to produce articles with a trimmed margin and stitched seam, comprising a sewing mechanism adapted to feed a pair of plies of material across a cloth plate and to form a line of stitching; a trimming mechanism adapted to form trimmed margins on the plies relative to the line of stitching; means for driving said sewing and trimming mechanisms synchronously; a guide member for moving one of said multiple plies to vary the margin thereof relative to the margin of the remaining ply; and an auxiliary guide including a straight edge for insuring straight travel of the remaining ply relative to the trimming mechanism and a spring for pressing the ply onto the cloth plate to facilitate control and feeding thereof.

26. Apparatus for forming a trimmed margin and stitched seam comprising a sewing mechanism with a needle adapted to feed and to stitch two plies of material; a trimming mechanism driven by said sewing mechanism; a work controlling device adapted to guide one ply of material uniformly and the other ply variably relative to the trimming mechanism; and an auxiliary guide, associated with said work controlling device adapted to split the uniformly and variably guided plies, and to form a straight edge and pressing medium to facilitate control and feeding of the uniformly guided ply.

27. Apparatus to produce articles with a trimmed margin and a stitched seam, comprising a sewing mechanism adapted to feed a ply of material and to form a line of stitching; a trimming mechanism adapted to form a trimmed margin on said ply of material relative to the line of stitching; means for driving said sewing and trimming mechanisms synchronously; and means adapted to control and to move said ply of material to vary the margin thereof relative to the line and at the time of stitching.

28. Apparatus to produce articles with a trimmed margin and a stitched seam, comprising a sewing mechanism adapted to feed a ply of material and to form a line of stitching; a trimming mechanism adapted to form a trimmed margin on said ply of material relative to the line of stitching; means for driving said sewing and trimming mechanisms synchronously; and means associated with the driving means adapted to control and to move said ply of material to vary the margin thereof relative to the line and at the time of stitching.

29. Apparatus to produce articles with a trimmed margin and a stitched seam, comprising a sewing mechanism adapted to feed a ply of material and to form a line of stitching; a trimming mechanism adapted to form a trimmed margin on said ply of material relative to the line of stitching; means for driving said sewing and trimming mechanisms synchronously; means adapted to control and to move said ply of material to vary the margin thereof relative to the line and at the time of stitching; and a pattern plate operated by the last named controlling means adapted to form a variously shaped margin relative to the line of stitching.

30. Apparatus to produce articles with a trimmed margin and a stitched seam, comprising a sewing mechanism adapted to feed a ply of material and to form a line of stitching; a trimming mechanism adapted to form a trimmed margin on said ply of material relative to the line of stitching; means for driving said sewing and trimming mechanisms synchronously; means adapted to control and to move said ply of material to vary the margin thereof relative to the line and at the time of stitching; and an interchangeable pattern plate operated by the last named controlling means adapted to form a predetermined variously shaped margin relative to the line of stitching.

31. Apparatus for forming an article with a trimmed margin and a stitched seam, comprising a sewing mechanism adapted to feed a ply of material and having a needle to form a seam; a trimming mechanism, driven by said sewing mechanism and adapted to form a seam margin; and a movable control member between said needle and the trimming mechanism adapted to control the width of the seam margin.

32. Apparatus for forming an article with a trimmed margin and a stitched seam, comprising a sewing mechanism adapted to feed a ply of material and having a needle to form a seam; a trimming mechanism, driven by said sewing mechanism and adapted to form a seam margin; a movable control member between said needle and the trimming mechanism adapted to control the width of the seam margin; and driving means adapted to drive said sewing mechanism, trimming mechanism and movable control member coordinately.

33. Apparatus to produce articles with a trimmed margin and a stitched seam, comprising a sewing mechanism adapted to feed a ply of material and to form a line of stitching; a trimming mechanism adapted to form a trimmed margin on said ply of material relative to the line of stitching; means for driving said sewing and trimming mechanisms synchronously; means adapted to control and to move said ply of material to vary the margin thereof relative to the line and at the time of stitching; driving means adapted to drive said sewing mechanism, trimming mechanism, and control means coordinately; and coupling means adapted to connect and disconnect the trimming mechanism and the control means to the driving means.

34. The method of forming an article from a ply of material in a single handling which consists in the steps of forming a seam by a line of stitching; of forming a pinked seam margin; and of moving the ply of material between the step of forming the seam and of forming a pinked seam margin to obtain a variable width seam margin.

35. The method of forming an article from a pair of plies in a single handling which consists in the steps, of joining the plies with a line of stitching; of forming a pinked seam margin on each of said plies; and of moving at least one of the plies between the step of joining the plies and the step of forming a pinked seam margin to obtain a variable width seam margin.

36. The method of forming an article from a pair of plies in a single handling which consists in the steps, of joining the plies with a line of stitching; of forming a pinked seam margin on each of said plies; and of moving only one of the plies relative to the other between the step of joining the plies and the step of forming a pinked seam margin to obtain one straight and one variable width seam margin.

37. Apparatus to produce an article with a trimmed margin and a line of stitching, comprising a sewing mechanism adapted to feed a ply of material and to form a line of stitching; a trimming mechanism adapted to form a trimmed margin on said ply of material; a pivoted guiding element for moving the ply of material between the sewing mechanism and the trimming mechanism to vary the margin thereof relative to the line of and at the time of stitching.

38. Apparatus to produce an article with a trimmed margin and a line of stitching, comprising a sewing mechanism adapted to feed a ply of material and to form a line of stitching; a trimming mechanism adapted to form a trimmed margin on said ply of material; a movable guiding element for moving the ply of material between the sewing mechanism and the trimming mechanism to vary the margin thereof relative to the line of and at the time of stitching; and a forked member cooperating with said movable guiding element.

39. Apparatus to produce an article with a trimmed margin and a line of stitching, comprising a sewing mechanism adapted to feed a ply of material and to form a line of stitching; a trimming mechanism adapted to form a trimmed margin on said ply of material; and a resilient guiding element for moving the ply of material between the sewing mechanism and the trimming mechanism to vary the margin thereof relative to the line of and at the time of stitching.

40. Apparatus to produce an article with a trimmed margin and a line of stitching, comprising a sewing mechanism adapted to feed a ply of material and to form a line of stitching; a trimming mechanism adapted to form a trimmed margin on said ply of material; a resilient guiding element for moving the ply of material between the sewing mechanism and the trimming mechanism to vary the margin thereof relative to the line of and at the time of stitching; and a forked member cooperating with said resilient guiding element.

41. Apparatus to produce an article with a trimmed margin and a line of stitching, comprising a sewing mechanism adapted to feed a ply of material and to form a line of stitching; a trimming mechanism adapted to form a trimmed margin on said ply of material; a pivoted guiding element for moving the ply of material between the sewing mechanism and the trimming mechanism to vary the margin thereof relative to the line of and at the time of stitching; and means adapted to drive the sewing mechanism, trimming mechanism, and the pivoted guiding element coordinately.

42. Apparatus to produce an article with a trimmed margin and a line of stitching, comprising a sewing mechanism adapted to feed a ply of material and to form a line of stitching; a trimming mechanism adapted to form a trimmed margin on said ply of material; a movable guiding element for moving the ply of material between the sewing mechanism and the trimming mechanism to vary the margin thereof relative to the line of and at the time of stitching; a forked member cooperating with said movable guiding element; and means adapted to drive the sewing mechanism, trimming mechanism, and the guiding element coordinately.

43. Apparatus to produce an article with a trimmed margin and a line of stitching, comprising a sewing mechanism adapted to feed a ply of material and to form a line of stitching; a trimming mechanism adapted to form a trimmed margin on said ply of material; a resilient guiding element for moving the ply of material between the sewing mechanism and the trimming mechanism to vary the margin thereof relative to the line of and at the time of stitching; and means adapted to drive the sewing mechanism, trimming mechanism, and the resilient guiding element coordinately.

44. Apparatus to produce an article with a trimmed margin and a line of stitching, comprising a sewing mechanism adapted to feed a ply of material and to form a line of stitching; a trimming mechanism adapted to form a trimmed margin on said ply of material; a guiding element for moving the ply of material between the sewing mechanism and the trimming mechanism to vary the margin thereof relative to the line of and at the time of stitching; driving means for the sewing mechanism; and a connector arm extending from said driving mechanism to the trimming mechanism to effect coordinate operation thereof.

45. Apparatus to produce an article with a trimmed margin and a line of stitching, comprising a sewing mechanism adapted to feed a ply of material and to form a line of stitching; a trimming mechanism adapted to form a trimmed margin on said ply of material; a guiding element for moving the ply of material between the sewing mechanism and the trimming mechanism to vary the margin thereof relative to the line of and at the time of stitching; driving means for the sewing mechanism; a connector arm extending from said driving mechanism to the trimming mechanism to effect coordinate operation thereof; a connecting pin between said connector arm and the trimming mechanism; and a substantially L-shaped channel accommodating said pin to form an effective and ineffective driving connection.

46. Apparatus to produce an article with a trimmed margin and a line of stitching, comprising a sewing mechanism adapted to feed a ply of material and to form a line of stitching; a trimming mechanism adapted to form a trimmed margin on said ply of material; a guiding element for moving the ply of material between the sewing mechanism and the trimming mechanism to vary the margin thereof relative to the line of and at the time of stitching; driving means for the sewing mechanism; a connector arm extending from said driving mechanism to the trimming mechanism to effect coordinate operation thereof; a connecting pin between said connector arm and the trimming mechanism; a substantially L-shaped channel accommodating said pin to form an effective and ineffective driving connection; and only one spring adapted to maintain said pin in both the effective and the ineffective condition relative to the L-shaped channel.

47. Apparatus to produce an article with a trimmed margin and a line of stitching, comprising a sewing mechanism adapted to feed a ply of material and to form a line of stitching; a trimming mechanism adapted to form a trimmed margin on said ply of material; a circular cutter in said trimming mechanism; driving means for operating said sewing mechanism and trimming mechanism coordinately; and a snap connection adapted to quickly render the driving means effective and ineffective to rotate the circular cutter in the trimming mechanism.

48. Apparatus to produce an article with a trimmed margin and a line of stitching, comprising a sewing mechanism adapted to feed a ply of material and to form a line of stitching; a trimming mechanism adapted to form a trimmed margin on said ply of material; a driving shaft in said trimming mechanism; means for driving said sewing mechanism and trimming mechanism coordinately; a guiding element adapted to control and move the ply of material; and a driving connection between said driving shaft and said guiding element.

49. Apparatus to produce an article with a trimmed margin and a line of stitching, comprising a sewing mechanism adapted to feed a ply of material and to form a line of stitching; a trimming mechanism adapted to form a trimmed margin on said ply of material; a driving shaft in said trimming mechanism; means for driving said sewing mechanism and trimming mechanism coordinately; a guiding element adapted to control and move the ply of material; a pattern mechanism associated with said guiding element; and a driving connection between said driving shaft and said pattern mechanism.

50. Apparatus to produce an article with a trimmed margin and a line of stitching, comprising a sewing mechanism adapted to form a line of stitching in a ply of material; feeding mechanism; a trimming mechanism adapted to form a trimmed margin on said ply of material; a driving shaft in said trimming mechanism; means for driving said sewing, feeding, and trimming mechanisms coordinately; a guiding element adapted to control and move the ply of material; and a driving connection, including a chain of gears, between said driving shaft and said guiding element.

51. Apparatus to produce an article with a trimmed margin and a line of stitching, comprising a sewing mechanism adapted to form a line of stitching in a ply of material; feeding mechanism; a trimming mechanism adapted to form a trimmed margin on said ply of material; a guiding element for moving the ply of material between the sewing mechanism and the trimming mechanism to vary the margin thereof relative to the line of and at the time of stitching; means for operating said sewing, feeding, and trimming mechanisms coordinately; a ratchet mechanism; a connection between said ratchet mechanism and said guiding element; and a driving connection between said feeding mechanism and said ratchet mechanism.

52. Apparatus to produce an article with a trimmed margin and a line of stitching, comprising a sewing mechanism adapted to form a line of stitching in a ply of material; feeding mechanism; a trimming mechanism adapted to form a trimmed margin on said ply of material; a guiding element for moving the ply of material between the sewing mechanism and the trimming mechanism to vary the margin thereof relative to the line of and at the time of stitching; means for operating said sewing, feeding, and trimming mechanisms; and a driving connection between said feeding mechanism and the guiding element.

53. Apparatus to produce an article with a trimmed margin and a line of stitching, comprising a sewing mechanism adapted to form a line of stitching in a ply of material; feeding mechanism; a trimming mechanism adapted to form a trimmed margin on said ply of material; a guiding element for moving the ply of material between the sewing mechanism and the trimming mechanism to vary the margin thereof relative to the line of and at the time of stitching; means for operating said sewing, feeding, and trimming mechanisms; a driving connection between said feeding mechanism and the guiding element; and means for rendering said driving connection effective and ineffective.

54. Apparatus to produce an article with a trimmed margin and a line of stitching, comprising a sewing mechanism adapted to form a line of stitching in a ply of material; feeding mechanism; a trimming mechanism adapted to form a trimmed margin on said ply of material; a guiding element for moving the ply of material between the sewing mechanism and the trimming mechanism to vary the margin thereof relative to the line of and at the time of stitching; means for operating said sewing, feeding, and trimming mechanisms; a driving connection between said feeding mechanism and the guiding element; and a latch for rendering said driving connection effective and ineffective.

55. Apparatus to produce an article with a trimmed margin and a line of stitching, comprising a sewing mechanism adapted to form a line of stitching in a ply of material; feeding mechanism; a trimming mechanism adapted to form a trimmed margin on said ply of material; a guiding element for moving the ply of material between the sewing mechanism and the trimming mechanism to vary the margin thereof relative to the line of and at the time of stitching; means for operating said sewing, feeding, and trimming mechanisms; a driving connection between said feeding mechanism and the guiding element; and means adapted to automatically control said driving connection.

56. Apparatus to produce an article with a trimmed margin and a line of stitching, comprising a sewing mechanism adapted to form a line of stitching in a ply of material; feeding mechanism; a trimming mechanism adapted to form a trimmed margin on said ply of material; a guiding element for moving the ply of material between the sewing mechanism and the trimming mechanism to vary the margin thereof relative to the line of and at the time of stitching; means for operating said sewing, feeding, and trimming mechanisms; a driving connection between said feeding mechanism and the guiding element; and means in said driving connection adapted to vary the extent of movement of the guiding element relative to the movement of the feeding mechanism.

57. Apparatus for forming a trimmed margin and stitched seam comprising a sewing mechanism adapted to feed multiple plies and having a needle to form the seam; a trimming mechanism adapted to form seam margins; and a control member between said needle and said trimming mechanism for manipulating the material of at least one of said plies to obtain a variable width seam margin on at least one of the said plies while the space between the needle and the trimming mechanism remains constant.

JOHN P. WEIS.